United States Patent
Fuse et al.

(10) Patent No.: US 7,799,483 B2
(45) Date of Patent: Sep. 21, 2010

(54) FUEL CELL AND ELECTRONIC APPARATUS ON WHICH THE FUEL CELL CAN BE MOUNTED

(75) Inventors: Toshihiro Fuse, Kawasaki (JP); Akihiro Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 11/855,050

(22) Filed: Sep. 13, 2007

(65) Prior Publication Data

US 2008/0075997 A1 Mar. 27, 2008

(30) Foreign Application Priority Data

Sep. 22, 2006 (JP) ............... 2006-257766

(51) Int. Cl.
*H01M 8/10* (2006.01)
(52) U.S. Cl. .................................... 429/479
(58) Field of Classification Search ............ 429/30
See application file for complete search history.

(56) References Cited

U.S. PATENT DOCUMENTS 6,645,659 B2 * 11/2003 Bisaka et al. ............... 429/37
7,297,434 B2    11/2007 Tanaka
2004/0131908 A1 *  7/2004 Tanaka ..................... 429/30
2009/0246585 A1   10/2009 Kariya et al.

FOREIGN PATENT DOCUMENTS

| JP | 2004-214040 A | 7/2004 |
| JP | 2005-310583 A | 11/2005 |
| WO | 2008/026715 A1 | 3/2008 |

* cited by examiner

*Primary Examiner*—Patrick Ryan
*Assistant Examiner*—Karie O'Neill Apicella
(74) *Attorney, Agent, or Firm*—Fitzpatrick, Cella, Harper & Scinto

(57) ABSTRACT

There is provided a fuel cell including: a membrane electrode assembly including a polymer electrolyte membrane, an oxidizer electrode provided on one surface of the polymer electrolyte membrane, and a fuel electrode provided on another surface of the polymer electrolyte membrane; a first presser member arranged on a side of the surface on which the oxidizer electrode is provided; and a second presser member arranged on a side of the surface on which the fuel electrode is provided, in which, when the fuel cell is deformed, the fuel cell can be applied with a pressure in a laminating direction of the oxidizer electrode and the fuel electrode due to a stress generated by the first presser member and the second presser member.

8 Claims, 6 Drawing Sheets

FUEL CELL AND ELECTRONIC APPARATUS ON WHICH THE FUEL CELL CAN BE MOUNTED

BACKGROUND OF THE INVENTION

1. Field of the Invention

The present invention relates to a fuel cell and an electronic apparatus on which the fuel cell can be mounted.

2. Description of the Related Art

A fuel cell is a focus of attention as a new energy source because the fuel cell has a higher power generation efficiency than that of a conventional power generation system and an emitted product caused in power generation is clean.

While there are developed various types of fuel cells, a polymer electrolyte fuel cell is suitable for a small electronic apparatus, in particular, a portable electronic apparatus used while being carried.

This is because the polymer electrolyte fuel cell has an advantage in that the polymer electrolyte fuel cell can be used at temperature close to room temperature and includes an electrolyte which is solid instead of being liquid, so the polymer electrolyte fuel cell can easily be carried.

The polymer electrolyte fuel cell basically includes a polymer electrolyte membrane having proton conductivity and a pair of electrodes arranged on both surfaces of the polymer electrolyte membrane. Each of the electrodes includes a catalyst layer mainly including platinum or a platinum group metal catalyst and a gas diffusion electrode formed on an outer surface of the catalyst layer and functioning to feed a gas and to collect electricity. A structure obtained by integrating the pair of electrodes and the polymer electrolyte membrane is called a membrane electrode assembly (hereinafter referred to as MEA). A fuel (hydrogen) is supplied to one of the electrodes and an oxidizer (oxygen) is supplied to the other of the electrodes, thereby performing power generation. Of the electrodes, the electrode to which the oxidizer is supplied is called an oxidizer electrode and the electrode to which the fuel is supplied is called a fuel electrode.

In the fuel electrode, due to a function of a catalyst, protons and electrons are generated from the supplied hydrogen. The protons move from the fuel electrode to the oxidizer electrode through the polymer electrolyte membrane. Further, the electrons move from the fuel electrode to the oxidizer electrode through an external load. In this process, electricity is obtained. On the other hand, in the oxidizer electrode, due to a function of the catalyst, from the protons and the electrons which are moved to the oxidizer electrode as described above and the supplied oxygen, water is generated.

Along with a demand for further downsizing of the electronic apparatus, downsizing of the fuel cell itself is becoming a more important object. That is, there is a demand for improvement in power generation efficiency of a fuel cell by generating a larger amount of electricity by a fuel cell having a smaller power generation area and efficiently taking out the electricity. In order to meet the demand, an attempt has been made in which a uniform pressure is applied to the fuel cell and a contact resistance between components of the fuel cell is reduced, thereby reducing electricity which is wastefully consumed.

Japanese Patent Application Laid-Open No. 2005-310583 proposes a fuel cell having a structure in which the fuel cell which is thin and flexible is wound around a core in a scroll shape and a winding end thereof is fixed by a fixing material. In this manner, by applying a pressure in a laminating direction of the fuel cell, an attempt is made to reduce a contact resistance between components of the fuel cell so that a power generation efficiency is improved.

Further, Japanese Patent Application Laid-Open No. 2004-214040 discloses a fuel cell having a structure in which components of the fuel cell is clamped by a screw in a laminating direction thereof, thereby reducing a contact resistance between the components to increase an output of the fuel cell.

However, the structures of the fuel cells according to the above-mentioned conventional techniques are not necessarily satisfactory for achieving application of a uniform pressure, further downsizing, and facilitation of an operation at a time of assembling the fuel cell.

For example, with the fuel cell according to Japanese Patent Application Laid-Open No. 2005-310583, there is a problem with downsizing of the fuel cell because the fuel cell is wound around the core in the scroll shape, so an additional member such as the fixing material for fixing the winding end is needed. Further, there is caused an operational burden at the time of assembling a cell unit such as an operation for winding the fuel cell in the scroll shape. It is difficult to apply a uniform pressure to a beginning portion of winding close to a central portion and a winding end portion close to a peripheral portion.

Further, with the fuel cell according to Japanese Patent Application Laid-Open No. 2004-214040, in order to reduce the contact resistance between the components by deflecting the presser members for applying the pressure in the vicinity of a central portion of the presser members toward the MEA side, the additional member such as a screw for fixing is required and a uniform pressure application is difficult.

SUMMARY OF THE INVENTION

It is an object of the present invention to provide a fuel cell which does not need an additional fixing member for uniformly reducing a contact resistance between components of the fuel cell, thereby being capable of achieving downsizing and facilitating an operation at a time of assembling a cell unit, and an electronic apparatus on which the fuel cell can be mounted.

According to the present invention, there is provided a fuel cell including:

a membrane electrode assembly including a polymer electrolyte membrane, an oxidizer electrode provided on one surface of the polymer electrolyte membrane, and a fuel electrode provided on another surface of the polymer electrolyte membrane;

a first presser member arranged on a side of the surface on which the oxidizer electrode is provided; and a second presser member arranged on a side of the surface on which the fuel electrode is provided, the fuel cell being characterized in that, when the fuel cell is deformed, the fuel cell can be applied with a pressure in a laminating direction of the oxidizer electrode and the fuel electrode due to a stress generated by the first presser member and the second presser member.

Further, an electronic apparatus according to the present invention is characterized in that the above-mentioned fuel cell can be mounted on the electronic apparatus.

The present invention can realize a fuel cell which does not need an additional fixing member for uniformly reducing a contact resistance between components of the fuel cell, thereby being capable of achieving downsizing and facilitating an operation at a time of assembling a cell unit, and an electronic apparatus on which the fuel cell can be mounted.

Further features of the present invention will become apparent from the following description of exemplary embodiments with reference to the attached drawings.

DESCRIPTION OF THE EMBODIMENTS

A description will be made of a fuel cell according to an embodiment of the present invention.

Figure 1:
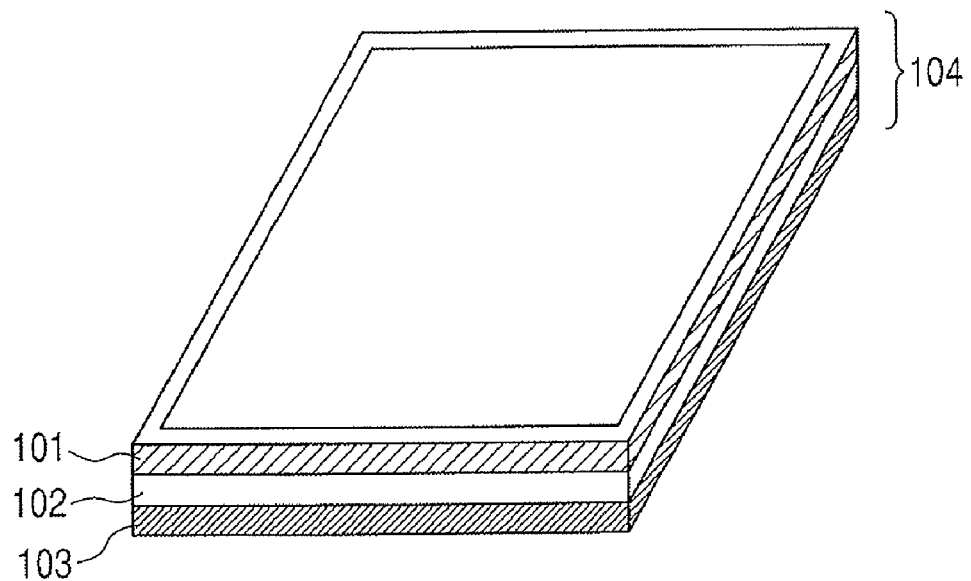
FIG. 1 is a schematic perspective view for illustrating a structure of a fuel cell according to an embodiment of the present invention.

In order to describe a structure of the fuel cell according to this embodiment, FIG. 1 illustrates a structure of the fuel cell including minimum components.

In FIG. 1, a fuel cell unit 104 includes a first presser member 101, a membrane electrode assembly (MEA) 102, and a second presser member 103.

In the fuel cell according to this embodiment, the first presser member 101 and the second presser member 103 can also serve as electrode members constituting both surfaces of the MEA 102, respectively.

Figure 2:
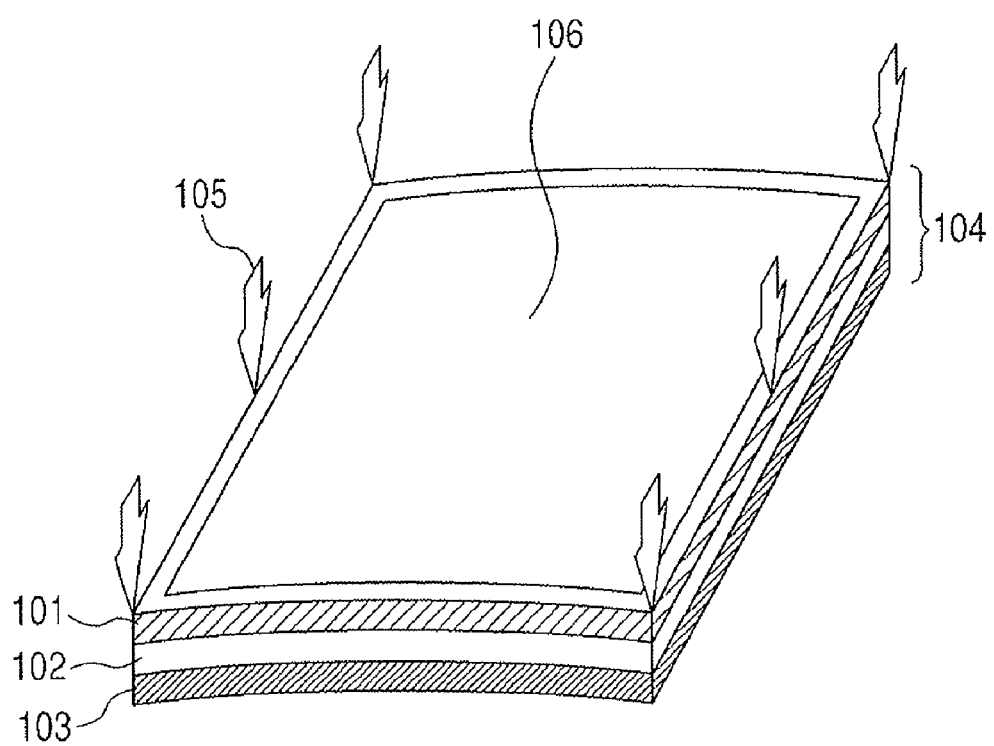
FIG. 2 is a schematic perspective view for illustrating a structure which is deformed by applying a deformation force to both end surfaces of the fuel cell according to the embodiment of the present invention.

FIG. 2 is a diagram illustrating a state where the fuel cell unit 104 is deformed by applying a deformation force 105 to both end surfaces of the fuel cell unit 104 to form a deformed surface 106. Hereinafter, in the drawings, the same reference numerals denote the same members.

Figure 3:
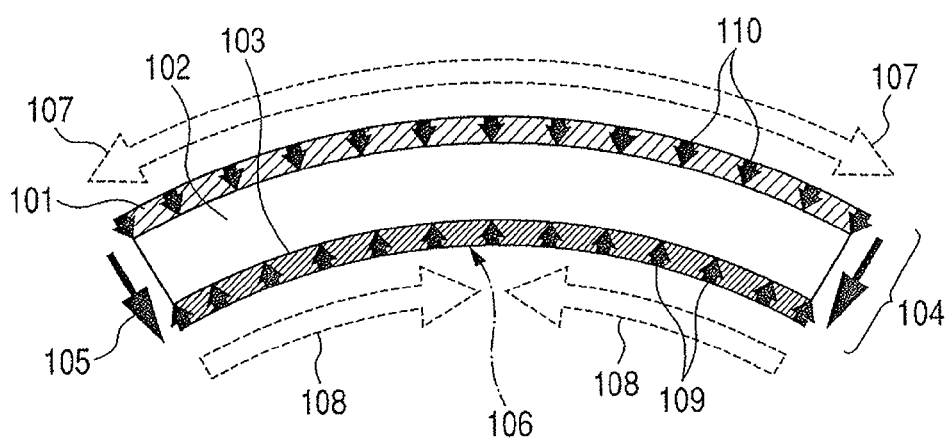
FIG. 3 is a schematic sectional diagram for illustrating an action in which a pressure is uniformly applied to the fuel cell in a laminating direction thereof when the fuel cell is deformed as illustrated in FIG. 2.

FIG. 3 is a sectional diagram for illustrating an action in which a pressure is uniformly applied to the fuel cell unit 104 in a stacking direction thereof when the fuel cell unit 104 is deformed as illustrated in FIG. 2.

In FIG. 3, the first presser member 101 and the second presser member 103 functioning as the upper and lower electrodes and the presser members sandwiching the MEA 102 are integrated with each other so as to prevent relative deviation therebetween in a direction along the deformed surface 106.

In a deformed state as illustrated in FIG. 3, a side of the first presser member 101 receives a stretching action 107 and a side of the second presser member 103 receives a compressing action 108.

At this time, the first presser member 101 and the second presser member 103 apply pressures 110 and 109, respectively, to the MEA 102, the pressures 110 and 109 being uniform over an entire surfaces.

In the fuel cell according to this embodiment, with the above-mentioned structure and in the above-mentioned state, the pressures between opposed surfaces of the presser members arranged on both surfaces of the MEA 102 serving as a center are larger than those before the deformation.

In this case, when the fuel cell is allowed to function as a fuel cell system, an electrical resistance value decreases when the pressures increase. As a result, an electrical output to be taken out increases.

Figure 4:
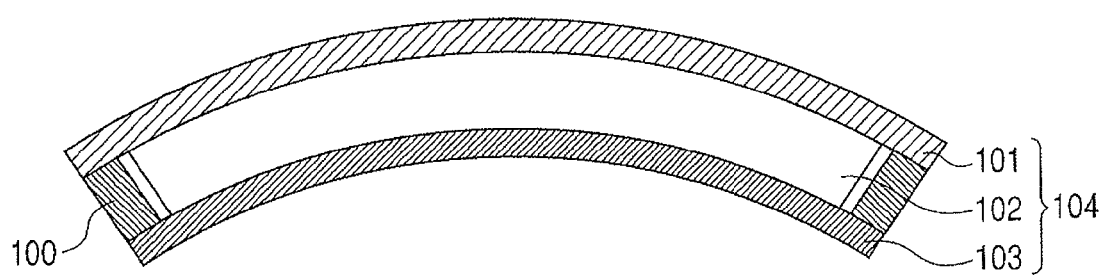
FIG. 4 is a schematic sectional diagram for illustrating a structure for preventing relative deviation in a direction along a deformed surface when being deformed according to the embodiment of the present invention.

FIG. 4 illustrates an example of a structure for preventing occurrence of relative deviation between the first presser member 101 and the second presser member 103 serving as the electrodes and the presser members in a direction along the deformed surface 106.

In FIG. 4, there are illustrated bonding members 100.

In the structure as illustrated in FIG. 4, the first presser member 101 and the second presser member 103 illustrated in FIG. 3 are fixed to each other through the bonding members 100 at opposed end surface portions on two sides by elongating bonding portions thereof. The bonding members 100 can also serve as end portion seals used in a normal assembly process. As a result, a need for additional bonding members can be eliminated. A bonding strength of the seals has to be larger than a stress generated when the fuel cell is deformed.

Note that, the present invention is not limited to the above-mentioned structure. Additional fixing means may specifically be employed as occasion needs.

According to the fuel cell of this embodiment, a contact resistance between components can be reduced to increase a power generation efficiency. Further, a special additional member for pressure application is not necessary, so the fuel cell can be made more compact.

Figure 5:
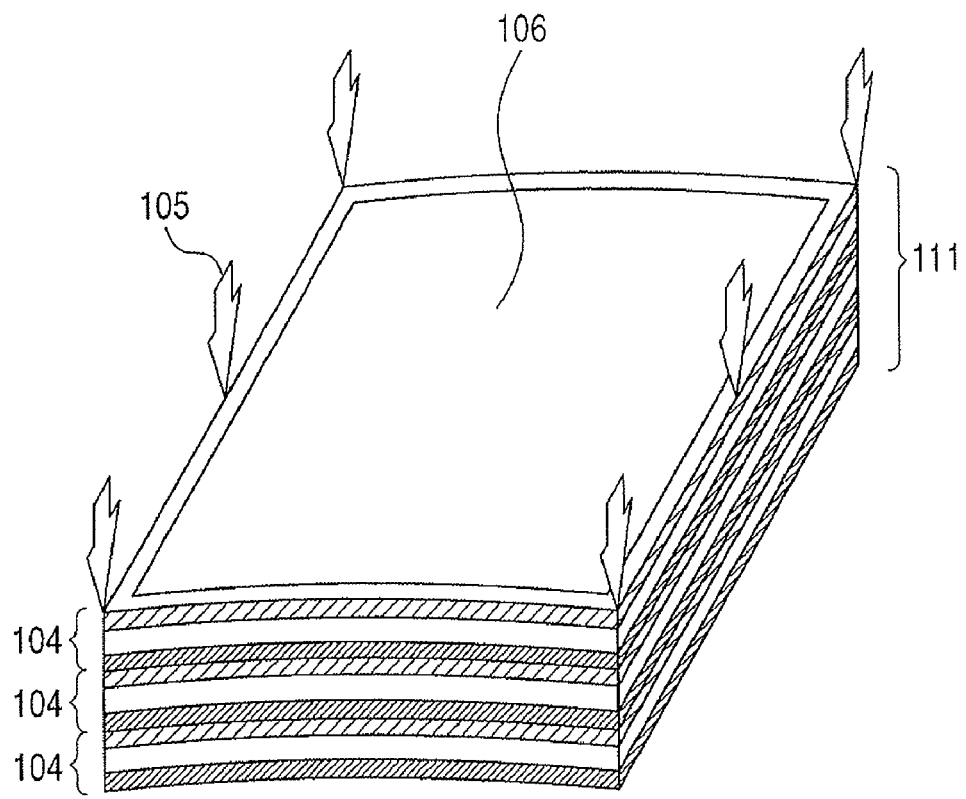
FIG. 5 is a schematic perspective view for illustrating a structure of a fuel cell stack including fuel cell units stacked on each other according to the embodiment of the present invention.

FIG. 5 illustrates a structural example of a fuel cell stack 111 structured by stacking the fuel cell units 104.

Also in the structure of the fuel cell stack 111, by applying the deformation force 105 to form the deformed surface 106, the same effect can be obtained.

Figure 6:
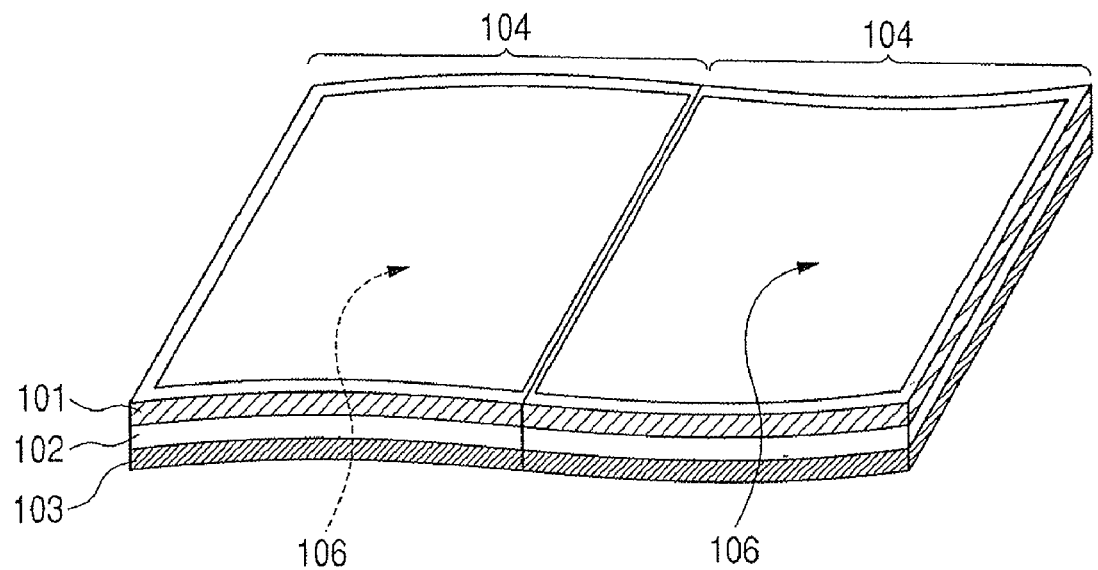
FIG. 6 is a schematic perspective view illustrating a structure of the fuel cell including the fuel cell units arranged in a planar arrangement according to the embodiment of the present invention.

Further, FIG. 6 illustrates a structural example of a cell unit formed by continuously arranging the fuel cell units 104 in a planar arrangement.

In the structural example, the single cell units 104 are applied with deformation forces in directions opposite to each other so that a cell structure in which the deformed surfaces 106 are deformed in directions opposite to each other can be realized.

As a result, pressure application in a thickness direction of the fuel cell can be maintained.

The structures described with reference to FIGS. 5 and 6 are only part of examples of the present invention. Also in the fuel cell according to the other embodiments, by applying the deformation force to form the deformed surface as in the structure of the fuel cell unit of a minimum unit described with reference to FIG. 1, the effect of the present invention can be obtained.

Next, a description will be made of an ideal shape of the deformed surface for stably obtaining an electrical output with efficiency. The ideal shape of the deformed surface of the present invention is a shape allowing a pressure to uniformly be applied over an entire surface of the fuel cell by using a stress due to elastic forces generated by the presser members.

In a case where the deformation occurs beyond an elastic region of the presser members so that the presser members cause plastic deformation, a concentrated pressure is applied to a portion where the plastic deformation is caused or the vicinity thereof.

As a result, unevenness is caused in the pressure to be applied, thereby increasing an electrical contact resistance value and reducing the power generation efficiency.

Accordingly, the deformation is desirably performed within an elastic deformation range of components including the MEA 102.

Note that, a relationship between a degree of the deformation and the contact resistance value is affected by a modulus of elasticity of each of the presser members, a thickness thereof, a uniformity of a surface thereof, and the like which are determined according to a material thereof. Therefore, it is desirable that electrical output characteristics be experimentally obtained to decide optimum values thereof.

According to the fuel cell of this embodiment as described above, the fuel cell unit 104 is deformed, thereby enabling generation of a uniform pressure between the first presser member 101 and the second presser member 103 with respect to the MEA 102.

As a result, the contact resistance between the components of the fuel cell can be reduced, and the power generation efficiency of the fuel cell can be improved.

Further, there is no need for an additional member to be used, so downsizing is possible.

Further, by deforming the fuel cell when the fuel cell is mounted on an apparatus, a stress is generated. As a result, the contact resistance can be reduced.

Thus, there is no need for a conventionally required dedicated member for pressure generation at the time of assembly of the fuel cell. Further, an operation required for the pressure generation can be facilitated.

Hereinafter, embodiments of the present invention will be described in more detail.

Embodiment 1

In Embodiment 1, a description will be made of a case where the present invention is applied and, for deformation means of a fuel cell, a mechanical force is used for deforming the fuel cell.

As components of the fuel cell, structural materials having a relatively small modulus of elasticity, such as a resin, a rubber, and a relatively thin light metal having a thickness of 1 mm or smaller are used. As a result, the fuel cell can be mounted while being deformed by a hand.

Figure 7:
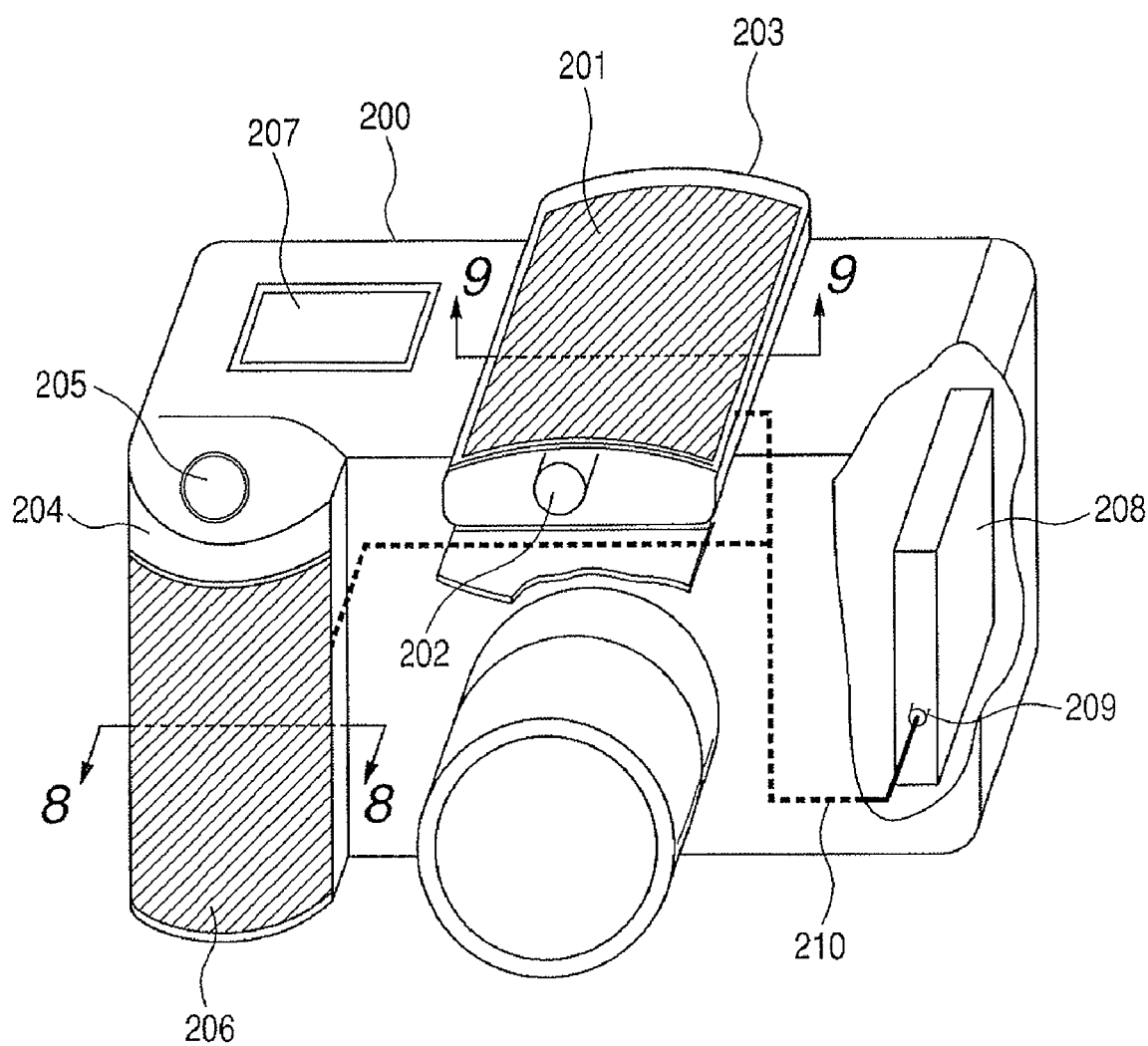
FIG. 7 is a schematic perspective view for illustrating a structure in which fuel cells according to a first embodiment of the present invention are mounted on a camera.

FIG. 7 illustrates a structure in a case where fuel cells 201 and 206 are mounted on a camera 200.

In this example, the fuel cells 201 and 206, which are deformed by a mechanical force, are mounted on a flashlight accommodation case 203 and a grip portion 204 constituting curved portions of an outer portion of the camera 200 by utilizing the flashlight accommodation case 203 and the grip portion 204.

A fuel tank 208 is provided inside the camera 200, and a fuel is fed from a fuel supply outlet 209 thereof to each of the fuel cells through a fuel supply piping 210.

Further, a system can be structured, for supplying electricity generated by the fuel cells to a display panel 207, a flashlight 202, and a shutter switch 205 constituting a part of a function portion of the camera 200.

Figure 8:
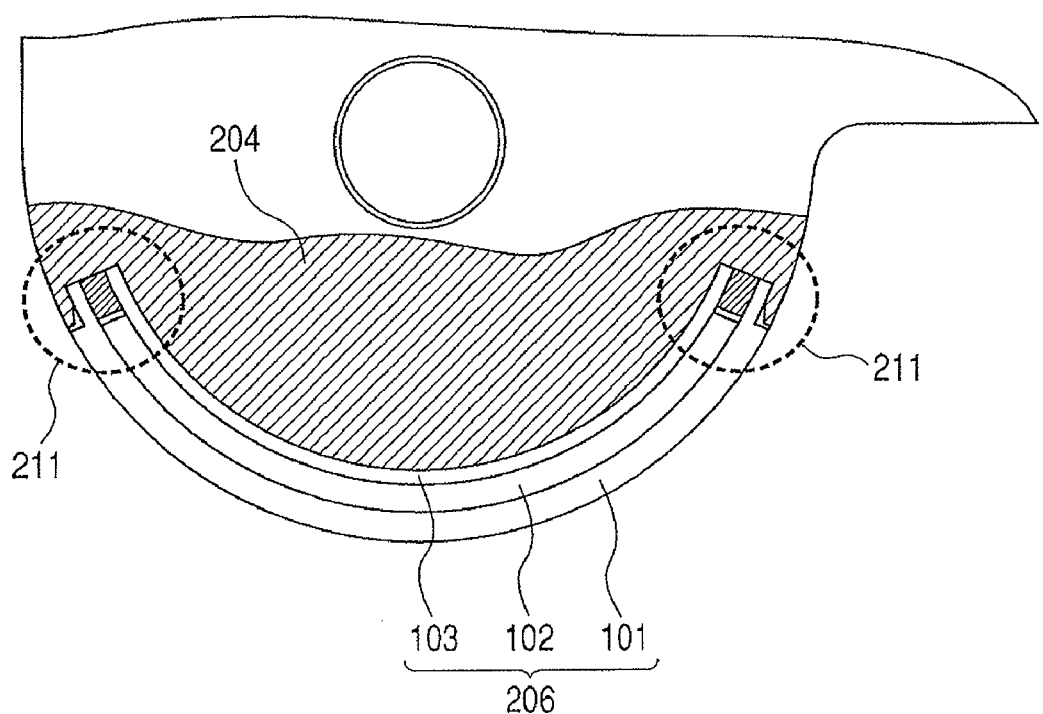
FIG. 8 is a schematic sectional diagram for illustrating a structure in which the fuel cell is mounted on a grip of the camera according to the first embodiment of the present invention.
Figure 9:
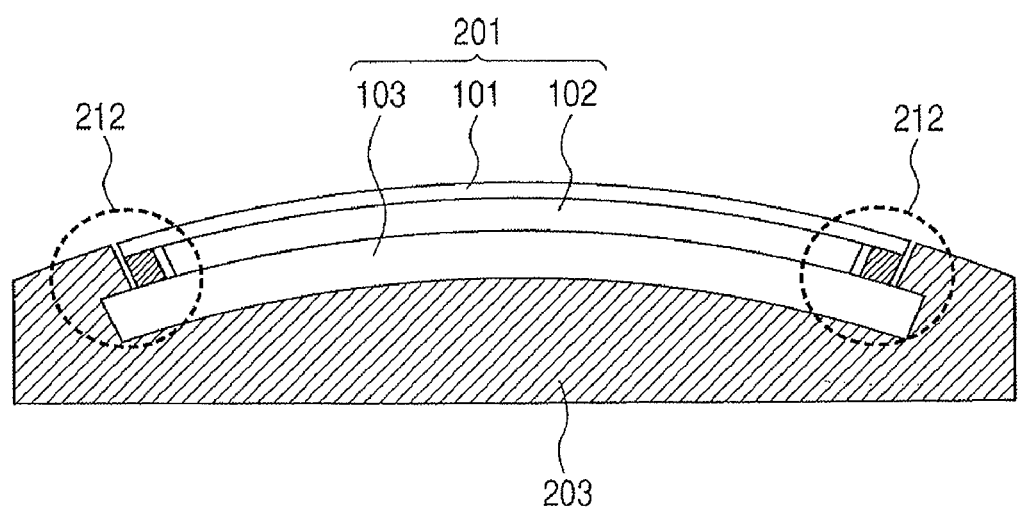
FIG. 9 is a schematic sectional diagram for illustrating a structure in which the fuel cell is mounted in a flashlight accommodation case of the camera according to the first embodiment of the present invention.

FIG. 8 is a schematic sectional view for illustrating a state of the fuel cell 206 mounted on the grip portion 204. FIG. 9 is a schematic sectional view for illustrating a state of the fuel cells 201 and 206 mounted on the flashlight accommodation case 203.

FIG. 8 is the sectional view taken along the line 8-8 of FIG. 7. FIG. 9 is the sectional view taken along the line 9-9 of FIG. 7.

A schematic structural view of FIG. 8 illustrates a state where end portions of the first presser member 101 of the fuel cell which can be deformed by a mechanical force are each finished with a step to be fitted into fuel cell support portions 211 as a part of the grip portion 204. A schematic structural view of FIG. 9 illustrates a state where each of end portions of the second presser member 103 is fitted into fuel cell support portions 212 provided as part of the flashlight accommodation case 203.

As described above in Embodiment 1, by employing the present invention, reduction in thickness of a cell unit can be realized, and plural cell units can be arranged so as to be distributed on an outer surface of an apparatus.

Accordingly, an exterior surface which has not been used so far can be effectively utilized.

In particular, according to an installation example of a main battery of a conventional household electric apparatus, the main battery is mainly mounted inside the apparatus. Therefore, based on priority with respect to the other members, an installation place is limited and a degree of design freedom of the apparatus is low.

However, according to the structure of this embodiment, the mounting is not limited to the inside of the apparatus, and the mounting on an outside is possible, thus also serving as an external member. Therefore, the degree of design freedom increases, so the structure is desirable.

Embodiment 2

In Embodiment 1, a stress is generated by the mechanical deformation. In Embodiment 2, a description will be made of a fuel cell having a structure in which a deformation amount is further increased by use of heat, so a pressure to be applied is further increased.

In this embodiment, in the structure illustrated in the schematic structural view of FIG. 9 according to Embodiment 1 of the present invention, heat is applied to the second presser member 103 of the fuel cell 201, thereby causing deformation in the second presser member 103.

Figure 10:
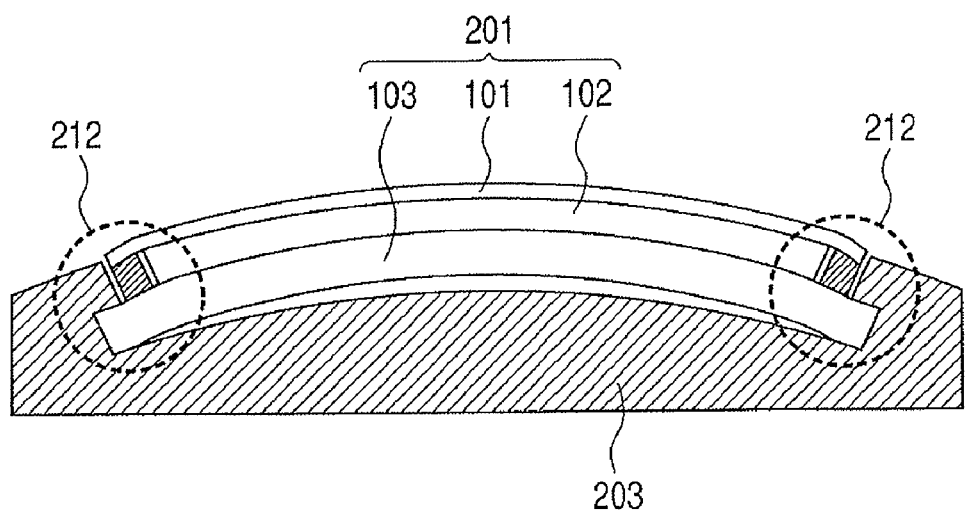
FIG. 10 is a schematic sectional diagram for illustrating a structure in a case where a pressure to be applied is made higher by using heat according to a second embodiment of the present invention.

The fuel cell 201 is installed by being fitted into recessed portions of the flashlight accommodation case 203 for installing the fuel cell such that both ends of the second presser member 103 abut on the recessed portions and the fuel cell 201 as a whole is deformed in advance so that the first presser member 101 side is convexed. When the fuel cell 201 is in operation, to the presser member 103, heat generated by a circuit component such as an IC incorporated in an electronic apparatus or generated by the fuel cell 201 itself is transmitted, thereby causing elongation of the presser member 103 due to thermal expansion. As a result, the second presser member 103 moves toward the first presser member 101 as illustrated in FIG. 10, thereby causing further deformation. In this case, between the first presser member 101 and the second presser member 103, there can be generated a pressure larger than a pressure applied to the MEA 102 due to the deformation at the time of installation. When operations of the fuel cell and the electronic apparatus are stopped and generation of heat is stopped, the further applied pressure is released. Thus, the pressure during non-operation is relatively low, so mechanical stress with respect to the fuel cell 201 can be reduced. The above-mentioned characteristics according to this embodiment enables to elongate life of the fuel cell 201 while improving the power generation efficiency during the operation thereof, and therefore is more desirable.

Note that, in a case where the first presser member 101 and the second presser member 103 are elongated in the same manner, the further applied pressure is alleviated. In order to prevent this, it is desirable that the fuel cell be installed in a place facing the outside of the electronic apparatus such that a temperature of the first presser member 101 does not rise to a large degree and that a material be selected such that a coefficient of thermal expansion of the first presser member 101 is smaller than a coefficient of thermal expansion of the second presser member 103.

Embodiment 3

Figure 11:
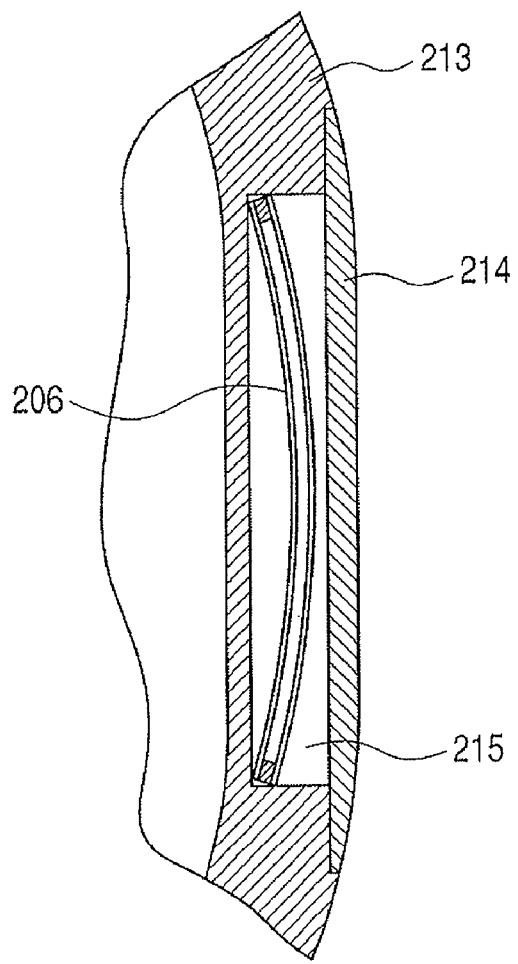
FIG. 11 is a schematic sectional diagram for illustrating a structure in which the fuel cell according to the first embodiment of the present invention is mounted on an arbitrary groove portion of an apparatus.

Further, FIG. 11 is a schematic structural view of Embodiment 3 of the present invention in which a fuel cell is mounted in a groove portion provided to a product.

In this embodiment, a fuel cell 206 is deformed to be fitted into a groove 215 having a width smaller than a length of the fuel cell 206 which is not applied with stress and is not deformed, and a case lid 214 is attached to the groove 215. A part of a camera body is denoted by reference numeral 213.

A structure of the present invention is not limited to the above-mentioned structure. An object of the present invention can be achieved as long as there is a groove in the inside or the outside of the apparatus, the groove having a width smaller than a length of the fuel cell which is not deformed in a direction in which the fuel cell is desired to be deformed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-257766, filed Sep. 22, 2006, which is hereby incorporated by reference herein in its entirety.

What is claimed is:

1. A fuel cell comprising:
    a membrane electrode assembly including a polymer electrolyte membrane, an oxidizer electrode provided on one surface of the polymer electrolyte membrane, and a fuel electrode provided on another surface of the polymer electrolyte membrane;
    a first presser member arranged on a side of the surface on which the oxidizer electrode is provided; and
    a second presser member arranged on a side of the surface on which the fuel electrode is provided,
    wherein stress is generated in the first presser member and the second presser member mechanically or thermally and is applied to the membrane electrode assembly in a laminating direction of the oxidizer electrode and the fuel electrode for reducing contact resistance in the membrane electrode assembly by bending of the first presser member and the second presser member in the same direction as each other, and
    wherein the first presser member and the second presser member also each serve as an electrode member.

2. The fuel cell according to claim 1, wherein the first presser member and the second presser member are fixed to each other at end surface portions thereof by a bonding member.

3. The fuel cell according to claim 2, wherein the bonding member also serves as a sealing member.

4. The fuel cell according to claim 1, wherein the fuel cell includes a single fuel cell unit.

5. The fuel cell according to claim 1, wherein the fuel cell is structured as a fuel cell stack including plural fuel cell units stacked on each other.

6. The fuel cell according to claim 1, wherein the fuel cell comprises plural fuel cell units which are arranged in a planar arrangement.

7. An electronic apparatus, wherein the fuel cell according to claim 1 can be mounted on the electronic apparatus.

8. The electronic apparatus according to claim 7, wherein the fuel cell is mounted on an exterior surface of the electronic apparatus.

* * * * *